United States Patent
Dubrulle et al.

(10) Patent No.: US 11,610,041 B2
(45) Date of Patent: Mar. 21, 2023

(54) TOOL AND METHOD FOR DESIGNING AND VALIDATING A DATA FLOW SYSTEM BY A FORMAL MODEL

(71) Applicant: COMMISSARIAT A L'ENERGIE ATOMIQUE ET AUX ENERGIES ALTERNATIVES, Paris (FR)

(72) Inventors: Paul Dubrulle, Paris (FR); Stephane Louise, Orsay (FR); Christophe Gaston, Montlhery (FR); Nikolay Kosmatov, Saint-Cyr-l'Ecole (FR); Mathieu Jan, Paris (FR); Arnault Lapitre, Bourg la Reine (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 70 days.

(21) Appl. No.: 17/271,964

(22) PCT Filed: Aug. 30, 2019

(86) PCT No.: PCT/FR2019/052008
§ 371 (c)(1),
(2) Date: Feb. 26, 2021

(87) PCT Pub. No.: WO2020/043999
PCT Pub. Date: Mar. 5, 2020

(65) Prior Publication Data
US 2021/0279393 A1   Sep. 9, 2021

(30) Foreign Application Priority Data
Aug. 31, 2018 (FR) ........................................ 1857849

(51) Int. Cl.
*G06F 30/347* (2020.01)
*G06F 30/3308* (2020.01)
(Continued)

(52) U.S. Cl.
CPC ............ *G06F 30/347* (2020.01); *G06F 17/16* (2013.01); *G06F 30/3308* (2020.01); *G06F 2111/04* (2020.01); *G06F 2111/10* (2020.01); *G06F 2113/02* (2020.01)

(58) Field of Classification Search
USPC ............................................................ 716/102
See application file for complete search history.

(56) References Cited

U.S. PATENT DOCUMENTS

2014/0040855 A1* 2/2014 Wang ....................... G06F 8/34
                                                                717/107

OTHER PUBLICATIONS

U.S. Appl. No. 17/260,852, filed Jan. 15, 2021, Mathieu Jan.
(Continued)

*Primary Examiner* — Bryce M Aisaka
(74) *Attorney, Agent, or Firm* — Oblon, McClelland, Maier & Neustadt, L.L.P.

(57) ABSTRACT

The present invention concerns a method and a tool for designing and validating a data flow system comprising a set of software and/or hardware actors ($a_i$, $a_j$) interconnected with each other by unidirectional communication channels ($c_i$, $c_j$), the tool comprising: —a modelling interface (11) configured to generate an instance of the system by specifying, in a formal manner, a real-time and reconfigurable data flow, the reconfiguration of the data flow being carried out dynamically by propagating reconfiguration data from one actor to another through the communication channels, —an analysis module (13) configured to prove a predetermined set of behavioral properties of the system by means of a static analysis of the instance, —a refinement interface (15) designed to allocate resources to the instance, thus establishing a configured instance, the allocation of resources being carried out in such a way that an implementation of the system complies with the configured instance, and —a conformity test module (17) configured to verify the conformity of the behaviour of an implementation of the system with respect to the configured instance.

14 Claims, 3 Drawing Sheets

(51) Int. Cl.
    *G06F 17/16*       (2006.01)
    *G06F 111/04*     (2020.01)
    *G06F 111/10*     (2020.01)
    *G06F 113/02*     (2020.01)

(56) References Cited

OTHER PUBLICATIONS

International Search Report dated Dec. 9, 2019 in PCT/FR2019/052008 filed on Aug. 30, 2018, citing documents AA and AV therein, 3 pages.

French Preliminary Search Report (with English translation of Categories of Cited Documents) dated Jul. 4, 2019 in French Application 1857849 filed on Aug. 31, 2018, citing documents AA and AV therein, 2 pages.

Do, X. K. et al., "Transaction Parameterized Dataflow: A Model for Context-Dependent Streaming Applications," 2016 Design, Automation & Test in Europe Conference & Exhibition (DATE), EDAA, 2016, pp. 960-965, XP032895100.

Timo, O. N. et al., "Automatic Test Generation for Data-Flow Reactive Systems Modeled by Variable Driven Timed Automata," Research report hal-00503000, version 1, 2010, 23 total pages.

Henia, R. et al., "Scenario Aware Analysis for Complex Event Models and Distributed Systems," 28th IEEE International Real-Time Systems Symposium (RTSS 2007), 2007, pp. 171-180.

Bannour, B. et al., "O☐-line Test Case Generation For Timed Symbolic Model-Based Conformance Testing," 24th International Conference on Testing Software and Systems (ICTSS), 2012, pp. 1-16.

\* cited by examiner

TOOL AND METHOD FOR DESIGNING AND VALIDATING A DATA FLOW SYSTEM BY A FORMAL MODEL

The present invention relates to a tool for designing and validating a system comprising a set of actors interconnected with each other by unidirectional communication channels.

PRIOR ART

The present invention applies to systems commonly referred to as "data flow systems" comprising a set of software and/or hardware actors that exchange quantifiable information between them, through unidirectional communication channels. Each actor expects to have received a statically specified quantity of data on its input channels with the purpose of consuming this quantity of data, carrying out processing of this data, and producing a statically specified quantity of data on its output channels intended for new actors. This behaviour is repeated indefinitely by each one of the actors. An example of such a data flow system is a real-time on-board system that can be used in an autonomous vehicle or with a driver.

The specification of these systems, taking account of all the constraints, is a complex technical problem per se. Then comes the work of allocating resources for an implementation of the specified system, and the verification that these resources are sufficient so that the implementation operates in accordance with its specification. Finally, for a given implementation, this implementation has to be tested and it has to be ensured that it complies with the specified behaviour.

Automatic tools are used to carry out these different tasks for specifying and verifying a data flow system that can comprise a large number of actors with many possible constraints and reconfigurations.

Currently, there are algorithms based on formal models for specifying real-time data flow systems that can be reconfigured. Such a method is for example described in document [1]. This method makes it possible to verify the resources required for the implementation as well as the absence of inter-blocking between the actors. However, it does not make it possible to verify the compliance of the behaviour of an implementation of the specified system with respect to the specification thereof and does not make it possible to verify the absence of an unknown state in the system for all the specified reconfigurations.

There are other specifications based on a formal model pour tester the compliance of the implementations of data flows. Such a method is for example described in document [2]. However, the only constraints that thus method takes into account are real-time methods. In addition, it provides a verdict only on the compliance of the output values of the system, not on the compliance of the behaviour of the system. However in certain cases, a system can provide a correct output value without necessarily complying with the specified behaviour.

Currently, there are no methods based on a formal model that take account both of the real-time constraints and reconfiguration constraints. Each one of the known methods covers only partially a portion of the steps and properties required for the specification and the verification of a system. None of these methods completely covers the designing and the validating of a system taking account of all the constraints that can exist in the system.

Furthermore, there are currently no known methods that make it possible to have the actors in the system operate according to different frequencies. Indeed, the methods according to the state of the art do not allow for the formal verification of the feasibility of the sizing of a connection channel between two actors operating according to different frequencies without communication data loss.

The object of the present invention is to propose a tool and a method for designing and validating a data flow system that overcomes the aforementioned disadvantages, in particular by taking account of the complete set of behavioural properties of the system thus allowing for a precise and detailed designing and validating of the system regardless of the reconfiguration while still optimising the calculation resources and memory of the system.

Presentation of the Invention

The present invention relates to a tool for designing and validating, implemented by computer, a data flow system modelling an on-board device of a piece of equipment, said data flow system comprising a set of software and/or hardware actors ($a_i$, $a_j$) interconnected with each other by unidirectional communication channels ($c_i$, $c_j$), said tool comprising:

- a modelling interface (11) configured to generate an instance of said system by specifying, in a formal manner, a real-time and reconfigurable data flow, the reconfiguration of the data flow being carried out dynamically by propagating reconfiguration data from one actor to another through the communication channels,
- an analysis model (13) configured to prove a predetermined set of behavioural properties of said system by means of a static analysis of said instance comprising the construction of a matrix defining the activation state of the actors and the state of the communication channels and the determining of a natural integer vector of which the product with the matrix is zero, the determining of said vector confirming the feasibility of the data flow system independently of the allocated resources,
- a refinement interface (15) designed to allocate resources to said instance complying with said predetermined set of behavioural properties, thus establishing a so-called configured instance, and
- a conformity test module (17) comprising unitary testing (171) and integration (173) tools, the unitary testing tool (171) simulating the production of data on input channels of the implementation of an actor, and verifying that the quantities consumed and produced by this implementation correspond to those specified for the actor implemented, the integration test tool (173) constructing the set of plots that correspond to the expected behaviour of the configured instance and ensuring that the plot provided belongs to this valid set thus verifying the conformity of the behaviour of an implementation of said system with respect to said configured instance.

This embodiment by a formal model makes it possible to automate a precise and detailed designing and validating of a data flow system regardless of the reconfiguration and without the necessity of having a centralised control. More particularly, reconfiguration in a distributed manner according to the invention makes it possible to take account of the complete set of behavioural properties while still optimising the calculation resources and memory of the system thus minimising calculation time and errors, and facilitates the certification process.

Advantageously, the instance of the system comprises rational data consumption and emission rates. This gives the possibility of taking account of the actors that have to operate according to different frequencies without any communication data loss between these actors. Thus, the verifying of the feasibility of the communication without loss, and where applicable the sequencing of the operations and the synchronising between the tasks, can easily be carried out regardless of the constraints on the frequencies associated with the actors.

Advantageously, the instance of the system comprises:
maximum frequency constraints for certain actors,
minimum frequency constraints for certain actors.

Thus, contrary to the state of the art, frequency constraints in the formal model and in the verification of the properties can be taken into account.

Advantageously, the instance of the system comprises:
all of the actors comprising generic actors configured to process data and mode actors configured to process data and/or select configuration modes,
the set of unidirectional communication channels connecting the set of actors with each other, each actor being associated with at least one input or output channel,
the integer or rational number of data produced or consumed by actor for each one of the input and output channels thereof, and
the set of modes associated with each mode actor, each mode actor being configured to dynamically choose for each one the activations thereof one and only one mode from among said set of modes.

This makes it possible to optimise the topology of the system and more particularly, the dynamic choice of the configurations makes it possible to minimise the number of mode actors and connection channels.

Advantageously, the instance of the systems further comprises for each generic actor a corresponding set of execution modes wherein it executes as well as an implicit set of all the other modes wherein it passes, an execution mode that can either be a nominal mode common to the entire system, or a specific mode chosen by a mode actor.

This makes it possible to facilitate the propagation of modes from actor to actor.

Advantageously, the instance of the systems further comprises an implicit set of feedback channels, a feedback channel being a channel connecting a data-producing generic actor to a data-consuming generic actor each executing in at least one of the modes chosen by the same mode actor, and in that there is a path without repetition starting from said same mode actor and terminating by the producing generic actor by passing through the consuming generic actor.

The feedback channels allow an actor of a processing chain to send the result to a preceding actor of the chain so that this preceding actor can perform another processing by taking account of the old result. The identification of these feedback channels thus makes it possible to describe iterative processes in the system without introducing undetermined modes due to the propagation of modes.

Advantageously, the instance of the systems further comprises an initial state of the system composed by channel of a rational number and of a sequence of modes of a length equal to said rational number rounded down, and by generic actor of the initial mode thereof.

This makes it possible to prevent the inter-blocking in certain situations such as for example in the case of a feedback loop and also makes it possible to initialise delays in order to allow for the starting of certain types of processing by the actors such as for example the calculation of a convolution product.

Advantageously, the predetermined set of behavioural properties comprises the following first, second, third and fourth properties:
the first property verifies that the resources required for the implementation of the communications between actors without data loss are limited for a periodic execution of the specified system,
the second property verifies that the frequency and/or period constraints can be complied without calling the first property into question,
the third property verifies the non-existence of inter-blocking for any number of actor activations, and
the fourth property verifies the non-existence of an unknown state in the system for all the specified reconfigurations and none of the other properties being called into question by dynamic changes in configuration.

Thus, by verifying the four properties in a complete manner, the tool according to the present invention ensures that the system is in a known and coherent state for all the reconfigurations and for all frequency, period and resource sizing constraints. Contrary to the state of the art, the present invention expresses the reconfiguration in such a way as to be able to completely prove that the four properties are verified.

According to an embodiment of the present invention, said system is a real-time on-board system of a piece of equipment, configured to receive measurements specific to said equipment and to deliver results that actuate operations for the correct operation of said equipment.

The present invention also relates to a real-time on-board system of a piece of equipment, comprising a set of software and/or hardware actors interconnected with each other by unidirectional communication channels, said on-board system being designed and validated by the tool according to any of the preceding characteristics, said on-board system being configured to receive measurements specific to said equipment and the environment thereof, and to deliver results that actuate operations for the correct operation of said equipment.

Advantageously, said equipment is an autonomous or non-autonomous vehicle of the land, railroad, aerospace or naval type.

The present invention also relates to a system of a real-time industrial process, designed and validated by the tool according to any of the preceding characteristics, said system being configured for the industrial manufacture of objects according to particular flow rate constraints and according to a reconfigurable process.

The present invention also relates to a method for designing and validating, implemented by computer, a data flow system modelling an on-board device of a piece of equipment, said data flow system comprising a set of software and/or hardware actors interconnected with each other by unidirectional communication channels, said method using a computer to implement the following steps:
generating an instance of said system by specifying, in a formal manner, a real-time and reconfigurable data flow, the reconfiguration of the data flow being carried out dynamically by propagating reconfiguration data from one actor to another through the communication channels,
proving a predetermined set of behavioural properties of said system by means of a static analysis of said instance comprising the construction of a matrix defining the activation state of the actors and the state of the communication channels and the determining of a natural integer vector of which the product with the matrix is zero, the determining of said vector confirming the feasibility of the data flow system independently of the allocated resources, allocating resources to said instance complying with said predetermined set of behavioural properties, thus establishing a so-called configured instance, and simulating the production of data on input channels of the implementation of an actor, verifying that the quantities consumed and produced by said implementation correspond to those specified for the actor implemented, constructing the set of plots that correspond to the expected behaviour of the configured instance, and ensuring that the plot provided belongs to this valid set thus verifying the conformity of the behaviour of an implementation of said system with respect to said configured instance.

The present invention also relates to a non-transient computer-data storage medium tangibly storing code instructions configured for designing and validating a data flow system modelling an on-board device of a piece of equipment, said data flow system comprising a set of software and/or hardware actors interconnected with each other by unidirectional communication channels, characterised in that said code instructions can be executed by a processor in order to implement the following steps:

generating an instance of said system by specifying, in a formal manner, a real-time and reconfigurable data flow, the reconfiguration of the data flow being carried out dynamically by propagating reconfiguration data from one actor to another through the communication channels, proving a predetermined set of behavioural properties of said system by means of a static analysis of said instance comprising the construction of a matrix defining the activation state of the actors and the state of the communication channels and the determining of a natural integer vector of which the product with the matrix is zero, the determining of said vector confirming the feasibility of the data flow system independently of the allocated resources, allocating resources to said instance complying with said predetermined set of behavioural properties, thus establishing a so-called configured instance, and simulating the production of data on input channels of the implementation of an actor, verifying that the quantities consumed and produced by said implementation correspond to those specified for the actor implemented, constructing the set of plots that correspond to the expected behaviour of the configured instance, and ensuring that the plot provided belongs to this valid set thus verifying the conformity of the behaviour of an implementation of said system with respect to said configured instance.

BRIEF DESCRIPTION OF THE FIGURES

Other particularities and advantages of the device and of the method according to the invention shall appear better when reading the description given hereinafter, for the purposes of information but not limiting, in reference to the accompanying drawings wherein.

DETAILED DESCRIPTION OF THE INVENTION

The invention is based on a formal model for describing real-time constraints and dynamic reconfigurations in a data flow system, allowing for the verification of a set of properties required for the correct operation of the system. The result of this static analysis combined with configuration data for an implementation of the system allows for an automatic allocation of the resources required for the execution thereof, as long as such an allocation is feasible. Finally, a formal compliance relationship and a test environment make it possible to obtain a verdict on the compliance of such an implementation with the initially specified model.

This invention can apply to any data flow system comprising independent actors exchanging quantifiable information between them, through unidirectional communication channels. The actors can be software (for example, applications) and/or hardware (for example, sensors, cameras, probes, microprocessors, etc.) entities. Each actor is configured to wait until it has received a quantity of data that is statically specified on the input channels thereof with the purpose of consuming this quantity of data, to carry out (or not) a processing of this data, and to produce a quantity of data that is statically specified on the output channels thereof intended for new actors, and each one repeating this behaviour indefinitely. The consumption/processing/emission process is commonly referred to as an activation.

Each activation unfolds according to predefined reconfigurations, and for a given reconfiguration, the activation will either consume/process/produce (then referred to as executing), or do nothing (referred to as passing), and the choice of changing configuration is unpredictable.

Each actor is activated according to the predefined reconfigurations in time windows (called real-time) with optionally frequency constraints (or equivalently with period constraints).

In particular, the invention applies to a system taken on board a piece of equipment where compliance with the expected behaviour is considered to be very important for the safety and the correct operation of the equipment provided with such a system.

The recent real-time on-board systems for autonomous vehicles are an example of such systems where entities offer generic interfaces to allow concrete applications to exchange data between them, each application being independent and executing on a calculator with a distributed architecture. The connections between applications can be reconfigured according to the current operating mode of the vehicle, and/or the availability of the services. Finally, for the correct operation of the vehicle, time constraints are imposed on the operation of the applications.

Figure 1:
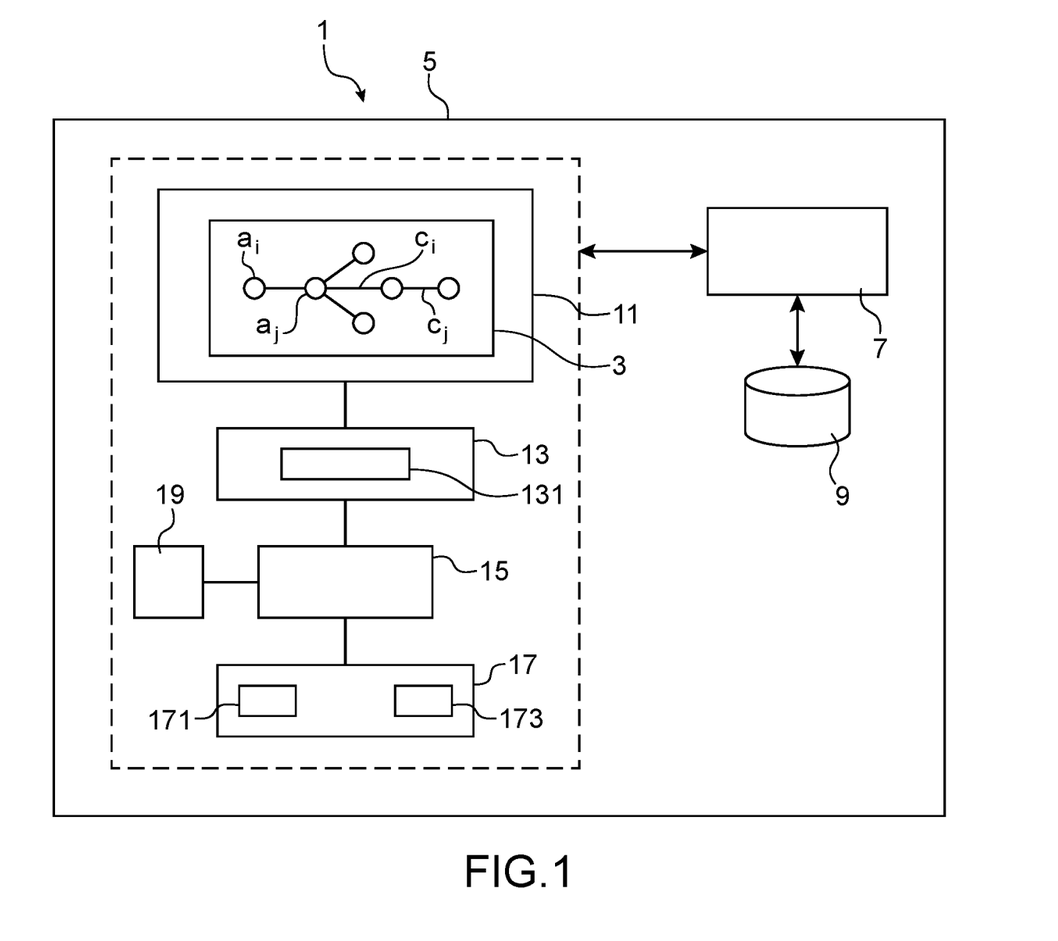
FIG. 1 diagrammatically shows hardware means implemented in the tool for designing and validating a data flow system, according to an embodiment of the invention.

FIG. 1 diagrammatically shows hardware means implemented in the tool for designing and validating a data flow system, according to an embodiment of the invention.

The tool 1 for designing and validating a data flow system 3 implements hardware means comprising an information processing machine such as a calculator or computer 5 comprising a microprocessor 7 and memoires 9. The microprocessor 7 is configured to execute one or more computer programs comprising program code instructions, stored in the memories 9 of the computer 5 and designed to implement the tool for designing and validating a data flow system 3.

The tool 1 for designing and validating comprises a modelling interface 11, an analysis model 13, a refinement interface 15, and a conformity test module 17.

The modelling interface 11 is a graphics software that is configured to interact with a software describing the data flow system 3. The graphics software and the software describing the system 3 are adapted to be executed by the computer 5.

The modelling interface 11 is configured to generate an instance of the system 3 by specifying, in a formal manner, a real-time and reconfigurable data flow. The term "instance" means the specification of the data flow described in the modelling interface 11. The modelling interface 11 is thus used to specify the data flow using as a basis a formal calculation model, independently of any implementation of this data flow.

Furthermore, the reconfiguration of the data flow is carried out dynamically by propagating reconfiguration data from one actor $a_i$ to another $a_j$ through communication channels $c_i$. This way of expressing the reconfiguration makes it possible to completely verify all the behavioural properties (described hereinafter) of the system 3.

The specification carried out by the modelling interface 11 has for purpose to be able to prove the behavioural properties of the system. Indeed, the analysis model 13 comprises verification tools 131 that are configured to prove a predetermined set of behavioural properties of the system by means of a static analysis of the instance. The static analysis comprises the construction of a state matrix defining the activation state of the actors and the state of the communication channels and the determining of a natural integer vector of which the product with the matrix is zero. The existence of such a vector confirms the feasibility of the data flow system independently of the allocated resources. This analysis shall be described in more detail further on in the description.

The refinement interface 15 is configured to allocate sufficient resources to the instance complying with the predetermined set of behavioural properties and thus establishing an instance called "configured instance" in what follows. Allocating the resource is carried out in such a way that an implementation of the system 3 complies with the configured instance.

The refinement interface 15 is thus used to specify additional time constraints for the instance. Note that the refinement interface 15 can specify several instances configured for the same instance. A conversion tool 19 adapts the result of the static analysis of an instance in order to provide inputs that allow for the allocation of resources for a configured instance.

The conformity test module 17 is configured to verify the conformity of the behaviour of an implementation of the data flow system 3 with respect to the configured instance.

More particularly, for an actor $a_i$ of a configured instance, "implementation of this actor" refers to any concrete entity that carries out the specified behaviour for this actor $a_i$.

Note that there can be several implementations for the same actor. Furthermore, for a configured instance, an "implementation of this configured instance" refers to any collection of implementations of actors comprising the instance, associated with the concrete means that allow it to carry out the specified behaviour for this instance. Also note that there can be several implementations for the same configured instance. Moreover, for an implementation of a configured instance, the term "plot" refers to a sequence of significant events occurring during the execution of this implementation.

Advantageously, the conformity test module 17 is comprised of a unitary 171 and integration test tool 173. The unitary test tool 171 simulates the production of data on the input channels of the implementation of an actor $a_i$, and verifies that the quantities consumed and produced by this implementation correspond to those specified for the actor implemented, by complying with all the constraints. The integration test tool 173 constructs all the plots that correspond to the expected behaviour of the configured instance and ensures that the plot provided belongs to this valid set.

According to an advantageous embodiment of the present invention, the instance of the system 3 comprises rational data consumption and emission rates. Thus, the instance comprises an integer or rational number of data produced or consumed by each actor $a_i$ and for each one of the input and output channels $c_i$ thereof.

Figure 4:
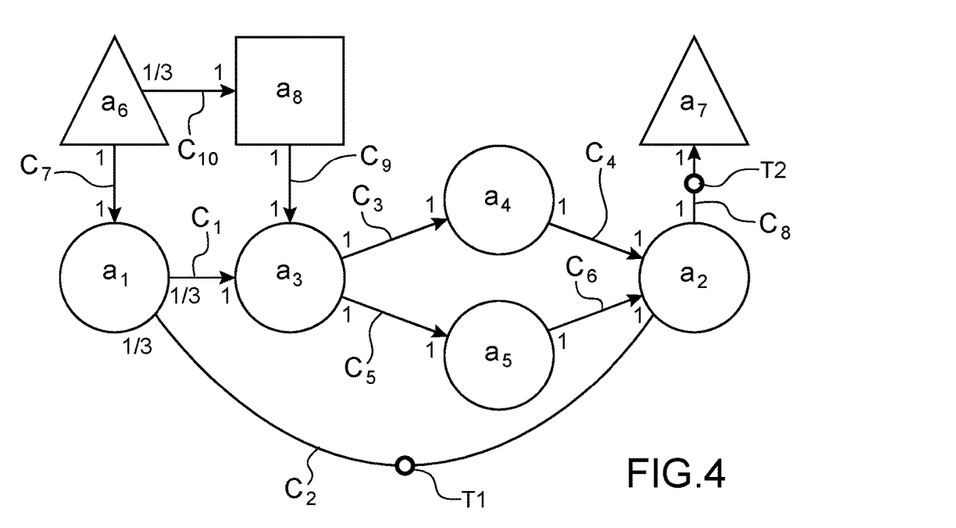
FIG. 4 diagrammatically shows an example of a data flow system modelled by a graph according to an embodiment of the invention.

This embodiment makes it possible to integrate frequency constraints at the formal model and in the verification of the properties and, consequently, allows two actors $a_i$ and $a_j$ communicating together via a channel $c_i$ to operate according to different frequencies without any loss of communication data between these two actors (see the example of FIG. 4).

The tool 1 for designing and validating according to the present invention guarantees the feasibility and the coherence of the data flow system 3 by allowing for the verification of the predetermined set of behavioural properties covering all the reconfigurations and all the frequency, period and resource sizing constraints. This predetermined set of behavioural properties comprises the following four properties.

The first property P1 verifies that the resources required for the implementation of the communications between actors without data loss are limited for a periodic execution of the specified system. This makes it possible for example to size the memories required to store the data without loss.

Figure 2A:
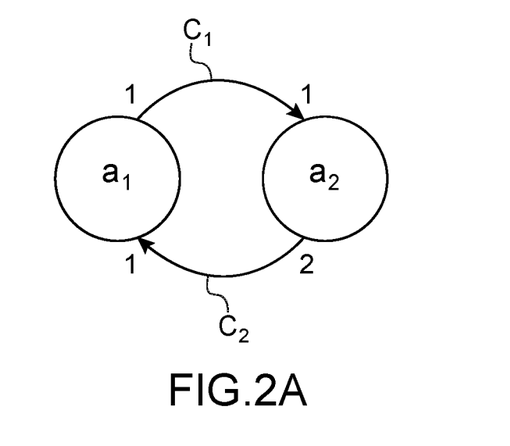
FIG. 2A-2C show examples of data flows that do not comply with the behavioural properties such as defined according to the present invention.

FIG. 2A shows an example of a data flow that does not comply with the first property. This example shows a system comprising first and second actors $a_1$ and $a_2$ mutually exchanging data through the channels $c_1$ and $c_2$. The first actor $a_1$ specifies that it produces and consumes a piece of data at each activation. The second actor $a_2$ specifies that it produces two pieces of data and consumes one at each activation. However, the resources required to store the data on the output channel $c_2$ of the second actor $a_2$ cannot be limited for an indefinite number of activations of these actors. Thus, in this situation the first property P1 is not verified.

The second property P2 verifies that the frequency and/or period constraints can be complied without the first property being called into question.

Figure 2B:
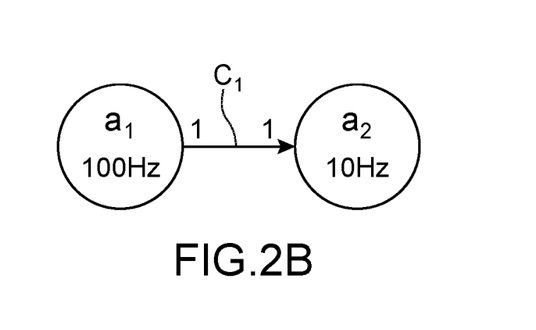

FIG. 2B shows an example of a data flow that does not comply with the second property. This example also shows a system with two actors $a_1$ and $a_2$, the first actor producing a piece of data via activation which will be consumed by each activation of the second actor. The frequency constraints are such that the first actor $a_1$ must be activated at 100 Hz and the second $a_2$ at 10 Hz. However, the resources required to store the data on the channel $c_1$ connecting the two actors $a_1$ and $a_2$ cannot be limited for an indefinite number of activations, although they are limited if the frequency constraints are removed.

The third property P3 verifies the non-existence of inter-blocking for any number of actor activations. An inter-blocking can result in a situation where a set of actors exchange data cyclically. Taking again the example of FIG. 2A, in the absence of a piece of data initially present on one of the two channels $c_1$ and $c_2$, none of the actors $a_1$ and $a_2$ can be activated. Thus, the third property P3 makes it possible to take account of the case of a cyclical data flow.

The fourth property P4 verifies the non-existence of an unknown state in the system for all the specified reconfigurations, there is no actor in the system that does not execute in any of the specified reconfigurations, and none of the other properties being called into question by dynamic changes in configuration.

Figure 2C:
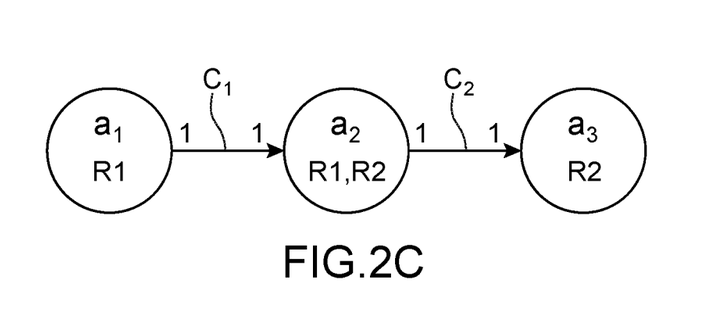

FIG. 2C shows an example of a data flow that does not comply with the fourth property. This example shows a system with three actors $a_1$, $a_2$ and $a_3$ and according to two possible reconfigurations. A first actor $a_1$ produces a piece of data via activation, which is consumed by each activation of a second actor $a_2$, and this second actor $a_2$ itself produces a piece of data via activation, consumed by each activation of a third actor $a_3$. In a first configuration $R_1$, only the first and second actors $a_1$ and $a_2$ are executed and the third actor $a_3$ passes. In a second configuration $R_2$ only the second and third actors $a_2$ and $a_3$ are executed and the first actor $a_1$ passes. In such a system, if the reconfiguration mode chosen is still the first configuration $R_1$, then the resources required to store the data on the channel $c_2$ between the second actor $a_2$ and the third actor $a_3$ are not limited for an undetermined number of activations. Inversely, there is an inter-blocking if the second configuration $R_2$ is still chosen. Finally, if the example is modified such that any of these actors $a_1$, $a_2$ and $a_3$ does not activate in any configuration, similar situations arise. Thus, the fourth property P4 makes it possible to verify the coherency of the system for all the specified reconfiguration modes by ensuring that there is no contradictory information.

Note that contrary to the methods of the state of the art, the way in which the notion of reconfiguration is expressed according to the present invention makes it possible to completely prove the four properties P1-P4.

Figure 3:
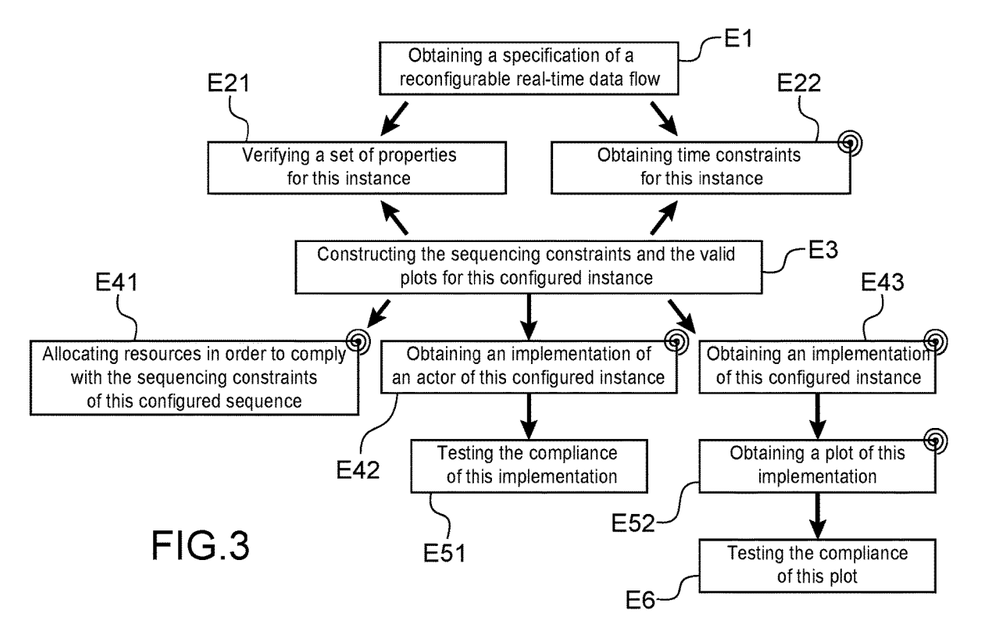
FIG. 3 diagrammatically shows a method for designing and validating a data flow system, according to an embodiment of the invention.

FIG. 3 diagrammatically shows a method for designing and verifying a data flow system, according to an embodiment of the invention.

Note that the steps that are on the same level can be chained together in parallel after the preceding step. Furthermore, the steps shown with a spiral (i.e. the steps E22, E41-E43, and E52) denote the possibility of applying this step several times for different configurations of the same instance, or different implementations of the same configured instance, or different plots of the same implementation.

The step E1 relates to the generating of an instance by the specification of a real-time data flow system 3 that can be reconfigured with the purpose of being able to prove all of the four behavioural properties P1-P4 of this system 3 defined hereinabove.

The instance of the system 3 comprises all the elements that define the formalism of the calculation model. These elements comprise the set of actors $a_i$, $a_j$ comprising the so-called generic actors that process data and so-called mode actors that are in charge of reporting reconfigurations and/or processing data; all of the channels c; connecting these actors together; the number of data produced or consumed per actor for each one of the input or output channels thereof, with the possibility for a channel to have only one of these numbers which is a rational number; all of the reconfiguration modes; the maximum frequency constraints for certain generic or mode actors; the minimum frequency constraints for certain generic or mode actors; and the initial state of the system.

The step E21 relates to the verification by means of a static analysis of all the behavioural properties P1-P4 for this instance. This makes it possible to verify the feasibility of the system independently of the allocated resources.

The step E22 relates to the obtaining of the time constraints for this instance.

The step E3 relates to the constructing of sequencing constraints and valid plots (i.e. set of valid states) for the configured instance in the preceding steps. This step makes it possible to define the order wherein the actors must carry out their operations according to the data and time constraints.

At the step E41 resources are allocated in order to comply with the sequencing constraints of the configured instance.

At the step E42, an implementation of an actor of the configured instance is obtained.

At the step E43, an implementation of the configured instance is obtained.

At the step E51, the compliance of the implementation of the step E42 is tested.

At the step E52, a plot of the implementation of the step E43 is obtained.

Finally, at the step E6, the compliance of the plot obtained at the step E43 is tested thus making it possible to verify the compliance of the implementation with the specified model.

The method according to FIG. 3 thus covers the specification of a real-time data flow system 3 that can be reconfigured, the configuration of an allocation of resources and the verification of the compliance of the behaviour of an implementation of the system, by taking account of the four properties P1-P4 hereinabove as a whole.

FIG. 4 diagrammatically shows an example of a data flow system modelled by a graph according to an embodiment of the invention.

The graph models a data flow with frequency constraints, different reconfigurations modes and initial data available for an initial consumption. The circles $a_1$-$a_5$ represent so-called generic actors that carry out processing on the data. These generic actors $a_1$-$a_5$ are thus adapted to consume data, make calculations to transform the data and produce results. The triangles $a_6$ and $a_7$ represent so-called "clock" $a_6$ or "deadline" $a_7$ actors that produce and consume data with frequency constraints. The square $a_8$ represents a so-called mode actor $a_8$ in charge of reporting reconfigurations. The directed arcs $c_1$-$c_{10}$ are unidirectional channels that each indicate a data flow between two actors and the associated numerical values giving the quantity of data produced or consumed on the channel.

According to this example, the modelled system 3 is comprised of five generic actors $a_1$-$a_5$, two temporal actors $a_6$ and $a_7$ (clock and deadline) and one mode actor $a_8$. A first generic actor $a_1$ (acquisition actor) acquires the data provided by a clock actor $a_6$ at 30 Hz. A second generic actor $a_2$ (control actor) sends a command to an actuator actor $a_7$ at 10 Hz. The command is determined according to the result of a reconfigurable processing chain constituted of a third generic actor $a_3$ (pre-processing actor) carrying out a pre-processing of the data produced by the acquisition actor $a_1$ in all the possible reconfigurations. In a first configuration (mode noted by $\lambda_1$), a fourth generic actor $a_4$ (fast actor) carries out a fast and low-definition processing of the data pre-processed by the pre-processing actor $a_3$. In the second reconfiguration (mode noted by $\lambda_2$), a fifth generic actor $a_5$ (slow actor) carries out a slow but high-definition processing. Thus, data processing path of the first configuration $\lambda_1$ is the path that connects the acquisition actor $a_1$ to the pre-processing actor $a_3$, to the fast processing actor $a_4$ and then finally to the control actor $a_2$. The second configuration $\lambda_2$ is defined by the path that connects the acquisition actor $a_1$ to the pre-processing actor $a_3$, to the slow processing actor $a_5$ and then finally to the control actor $a_2$. Thus, the configuration propagates from one actor to another and consequently, no centralised synchronisation on these reconfiguration modes is required. Each actor will communicate to its neighbour the configuration mode wherein it has to operate. The choice of the current configuration is carried out by the mode actor $a_8$ which preferably uses the high-definition processing when it is available.

According to this example, the fast processing actor $a_4$ each time that it is activated consumes a piece of data on its input channel $c_3$ (represented on the channel $c_3$ by a "1") and produces a piece of data on its output channel $c_4$ (represented on the channel $c_4$ by a "1"). Likewise for the slow processing actor $a_5$ that consumes a piece of data on its input channel $c_5$ and produces a piece of data on its output channel $c_6$. The control actor $a_2$ each time that it is activated consumes a piece of data on its first input channel $c_4$ or on its second input channel $c_4$ (according to the configuration mode) and produces a piece of data on its output channel $c_2$. The pre-processing actor $a_3$ each time that it is activated consumes a piece of data on its first input channel $c_1$ and a piece of data on its second input channel $c_9$ and produces a piece of data on its first output channel $c_3$ or on its second output channel $c_5$ (according to the configuration mode).

On the other hand, the acquisition actor $a_1$ consumes a rational number of data on its input channel $c_2$ (represented on the input channel $c_2$ by the value "1/3") and produces a rational number of data on its output channel $c_1$ (represented on the output channel $c_1$ by the value "1/3"). This means that the acquisition actor $a_1$ consumes or produces a piece of data every three activations. The example of FIG. 4 shows that at the initial state, there is a token T1 (i.e. a piece of data) available on the channel $c_2$ (between the control actor $a_2$ and the acquisition actor $a_1$. Then, the acquisition actor $a_1$ will consume this existing data on this channel $c_2$ and will produce a piece of data on its output channel $c_1$ (i.e. the channel $c_1$ that connects the acquisition actor $a_1$ to the pre-processing actor $a_3$). Thus, the acquisition actor $a_1$ has consumed a piece of data and has produced a piece of data. On the other hand, over the next two activations thereof, it will consume zero data and produce zero data. In other words, the acquisition actor $a_1$ consumes a piece of data and produces a piece of data every three activations. This makes it possible to synchronise the data between two actors that are operating according to different frequencies without any loss of data. Indeed, according to this, the acquisition appears three times for each command thus allowing for the transfer of data between the acquisition actor $a_1$ operating at 30 Hz and the control actor $a_2$ operating at 10 Hz without any loss of data.

In what follows, the essential elements of the formal definition of the calculation model (i.e. formalism) are summarised by referring for example to the system 3 of FIG. 4. According to this formalism, the specification of a data flow is comprised of the following elements F1-F9:

F1: The set of generic actors $a_1$-$a_5$ that process data is defined, as well as all the mode actors $a_6$ and $a_7$ that process data and/or select configuration modes.

F2: The set of channels $c_1$-$c_{10}$ that connect the actors together is defined, each actor being associated with at least one input or output channel.

F3: The number of data produced or consumed per actor is defined for each one of the input or output channels thereof, with advantageously the possibility for a channel of having one of these numbers to be a rational number. These numbers are represented by the values on the arcs $c_1$-$c_{10}$ connecting the actors of the example of FIG. 4.

F4: For each mode actor $a_8$ of a non-empty set of modes, the mode actor $a_8$ being in charge of dynamically choosing for each one the activations thereof one and only one of these modes (these modes are noted as $\lambda_1$ and $\lambda_2$). The choice of the current configuration is advantageously made by a single mode actor $a_8$ and this current configuration propagates in a distributed manner from one actor to another.

F5: For each generic actor $a_1$-$a_5$, the set of modes wherein it is executed is defined, and the implicit set of all the other modes wherein it passes. Note that all of the modes wherein a generic actor is executed is either a nominal mode common to the entire system, or a subset of the modes chosen by mode actors. In the example of FIG. 4, all of the actors except for the pre-processing $a_3$, fast processing $a_4$ and slow processing $a_5$ actors are executed in the nominal mode knowing that the pre-processing actor $a_3$ is executed in the modes $\lambda_1$ and $\lambda_2$, the fast processing actor $a_4$ is executed in the mode $\lambda_1$, and the slow processing actor $a_5$ is executed in the mode $\lambda_2$.

F6: Given the different modes, an implicit set of feedback channels is defined as all of the channels that connect two generic actors each executing in at least one of the modes chosen by the same mode actor, and such that there is a path without repetition starting from the mode actor and terminating by the producing actor on this channel, passing through a consuming actor.

F7: Maximum frequency constraints are defined for certain generic or mode actors. A possible way of expressing them is by so-called clock actors $a_6$ to which a frequency is associated. In the example of FIG. 4, the acquisition actor $a_1$ has a maximum frequency constraint of 30 Hz, expressed by the clock actor $a_6$ with for frequency 30 Hz, the arc $c_7$ that connects them, and the associated quantities of data.

F8: Minimum frequency constraints are defined for certain generic or mode actors. A possible way of expressing them is by so called deadline actors $a_7$ to which a frequency is associated. In the example of FIG. 4, the control actor $a_2$ has a minimum frequency constraint of 10 Hz, expressed by the deadline actor $a_7$ with for frequency 10 Hz, the arc $c_8$ that connects them, and the associated quantities of data. Note that the same actor can be forced to operate at a minimum and maximum frequency, in this case this is an exact frequency constraint. In other words, a frequency constraint is either maximal (not more than so many times per second), or minimal (at least as many times per second), or exact (exactly so many times per second).

F9: An initial state of the system composed by channel of a rational number and of a sequence of modes of a length equal to this rational number rounded down, and by generic actor of the initial mode thereof. In the example of FIG. 4, all the actors have the nominal mode for the initial mode, and the channels marked with a small circle T1 and T2 have an initial state with a value "1". Of course, the initial state can be expressed by any rational number (for example, 2/5; 4/3; etc.) and this stems from the fact that the production and consumption rates are rational according to an advantageous embodiment of the invention.

Furthermore, for a given specification, the specified behaviour for the system comprises the following characteristics C1-C7:

C1: The production policy in the channels is a non-blocking first-in-first-out (FIFO) policy.

C2: The consumption policy from the channels is blocking FIFO. Thus, when an actor is going to produce a piece of data on a channel, it will not be blocked by the consuming actor.

C3: The channels contain elementary quantities of data (i.e. tokens T1, T2). A token is an arbitrary unit that indicates the number of data on a channel at a given moment. The tokens are all formed from a mode and either significant data produced by an execution, or no data. The latter tokens advantageously represent the absence of data produced when the producer or the consumer passes into a given mode. Advantageously, this makes it possible to preserve the synchronisation between the tasks without the need to send effective data.

C4: At any time, the state of a channel is a rational number, and the integer number of tokens that it contains is this number rounded down. Advantageously, this makes it possible to determine at what moment the token is going to be consumed. In the example of FIG. 4, there is initially a token T1 (i.e. the rational number 1/1) on a channel $c_2$. The acquisition actor $a_1$ will consume 1/3 which will transform the state of the channel $c_2$ from 1/1 to 2/3 (i.e. 1-1/3) rounded to the value zero. However, the state of the channel $c_2$ is 2/3 which will allow the acquisition actor $a_1$ when it is activated to again remove 1/3 which will transform the state of the channel $c_2$ from 2/3 to 1/3 (i.e. 2/3-1/3) rounded to the value zero. Finally, on the third activation thereof the acquisition actor $a_1$ again removes 1/3 which will transform the state of the channel $c_2$ from 1/3 to zero. Thus, a token T1 is consumed by the acquisition actor $a_1$ every three activations.

C5: The atomic activation of each actor (regardless of whether it is executed or it passes), removes the specified rational number from the state of each one of the input channels thereof and adds the specified rational number to the state of each one of the output channels thereof. Note that an atomic process is an indivisible production and consumption process that has a beginning and an end that are well defined. The number of tokens consumed or produced is the absolute value of the difference between the state of the channel rounded down before activation and the state of the channel rounded down after activation.

C6: At each activation of a mode actor, it is executed and chooses one any only one of the modes that are arbitrarily associated with it. It associates with each jeton produced the mode chosen by this activation. For the consumers thereof that will potentially be executed in this chosen mode, and only for the latter, it associates significant data with each jeton. Note that in the state of the art, the quantity of data produced is changed in order to prevent the activation of a successor. On the other hand, the propagation mode according to the invention, makes it possible to systematically produce tokens, potentially empty according to the mode chosen, which does not prevent the activation of the successor, and therefore makes it possible to preserve the properties (see hereinafter).

C7: Before each activation of a generic actor, the current mode thereof is determined by the set L of modes associated with a token that will be consumed for each channel, with the channels for which no token is consumed in this activation being ignored. The token considered (for example the last one consumed) on each channel is chosen deterministically. In a possible embodiment, the rule for determining can be carried out according to the following points (a)-(f):

(a): if the set L is empty (i.e. the actor has no predecessors), the current mode is systematically nominal;

(b): if the set is a singleton, the current mode is then this unique element of L;

(c): if the set has more than one element, and it contains the undetermined mode (see hereinbelow), the mode is undetermined;

(d): if the set has more than one element, and the actor is executed only in nominal mode, the current mode is the nominal mode; and (e): if the set has more than one element, and the actor is executed in one or more modes A selected by a mode actor, then if $L \cap A$ is empty, the current mode does not change, if $L \cap A$ is a singleton, the current mode is the unique element of $L \cap A$, and the mode is undetermined in all the other cases.

The activation of each generic actor is done in the current mode thereof. The current mode is associated with all the tokens produced by this activation, except those produced on a feedback channel, to which the nominal mode is associated. The data associated with the tokens produced are determined by the current mode. If the actor passes into the current mode thereof, the tokens produced do not contain any data. If the actor is executed in the current mode thereof, for its consumers who will potentially be executed in this chosen mode, its consumers that are connected to it by a feedback channel, and only for the latter, it associates significant data to each token produced. For all of the other consumers thereof, it does not associate any data.

If an actor has a maximum frequency constraint, then two successive activations cannot take place faster than this frequency.

If an actor has a minimum frequency constraint, then two successive activations cannot take place slower than this frequency.

In what follows, methods for proving the four properties P1-P4 are given by way of example.

First property P1: A possible way of proving the first property for any instance is based on known methods for data flows. However, the present proof stands out by taking account of the rational quantities: This proof is defined by the following two steps P11 and P12:

First step P11: Constructing a matrix, noted as Γ, with one line per channel and one column per actor, and for each input of this matric there is:

e1: the value 0 if the actor is not connected to this channel;

e2: the number (potentially rational) added to the state of the channel for each activation of the actor if it is a producer on this channel;

e3: the opposite of the number (potentially rational) subtracted from the state of the channel for each activation of the actor if it is a consumer on this channel; and e4: the difference between the numbers (of which one potentially rational) added and subtracted from the state of the channel for each activation of the actor if it is both producer and consumer on this channel.

Second step P12: Resolving the system of equations making it possible to find a vector of natural integers $x \neq 0$ such that $\Gamma \cdot x = 0$. Finding such a vector x proves the first property P1. This vector is then used to prove the other properties.

Second property P2: In an embodiment wherein the time constraints are described as in FIG. 4, the capacity of verifying the second property for instances can be done according to the following innovative steps P21-P25:

First step P21: Verifying that if an actor has maximum and minimum frequency constraints, they are equal.

Second step P22: Calculating the largest common divisor t of all the frequency constraints in the system, and their least common multiple it.

Third step P23: Given the vector x, arbitrarily, choosing an actor of column i in $\Gamma$ with a frequency constraint noted as $\omega_i$ and with the element $x_i$ of x.

Fourth step P24: Calculating the following integer number:

$$k = \frac{\iota \cdot x_i}{\omega_i}$$

Fifth step P25: Verifying for each actor of column i in $\Gamma$ with a frequency constraint noted as $\omega_i$ and with the element $x_i$ of x there is:

$$x_i = \frac{k \cdot \omega_i}{\iota}$$

Third property P3: A possible way of proving the third property P3 is based on a known method for data flows in general but stands out by the taking into account of rational quantities. Given x and the initial state of the channels, this method consists of carrying out a symbolic activation of the system wherein each actor of column i in $\Gamma$ is activated at least $x_i$ times, and ensuring that this execution terminates.

Fourth property P4: The method of proving the fourth property P4 stems from the way in which the modes and the data are associated with the tokens to propagate the modes according to the innovative embodiment of the present invention. The method that follows is a non-limiting example of the verification of this property P4 according to the following steps P41-P47:

First step P41: Verifying that the sets of modes chosen by the mode actors are separate two by two (a mode is chosen by one and only one mode actor).

Second step P42: Also verifying that the set of modes associated with each generic actor is either the singleton containing the nominal mode of the system, or a subset of the set of modes chosen by a mode actor. Note that the modes associated with a generic actor are all selected by the same mode actor.

Third step P43: Verifying that if a generic actor has a set of associated modes that is a subset of those chosen by a mode actor, then: either this mode actor is a direct predecessor of this generic actor; or there is at least one of the direct predecessors of this actor such that the set of modes associated with this predecessor is a subset of the set of modes chosen by this mode actor.

Fourth step P44: For all the actors of column i in $\Gamma$ that are executed in at least one mode chosen by the same mode actor of column j in $\Gamma$, and which are on a path starting from this mode actor, and passing solely by actors that are executed in at least one of the modes chosen by this mode actor, then:

(a) Given the initial state of the channels, calculating the initial delay noted as $d_i$ such as for the first $d_i$ activations of the actor i the current mode thereof is known;

(b) For each input channel (except feedback channel) with for producer an actor of column k in $\Gamma$ that either is executed in a mode chosen by the mode actor of column j in $\Gamma$, or is the mode actor of column j in $\Gamma$, calculating the local mode change period noted as $p_{ik}$ such that:

$$p_{ik} = \frac{x_k}{x_i}$$

(c) Calculating the mode change period noted as $p_i$ as being the maximum of the local periods calculated hereinabove:

$$p_i = \max_{\forall k}(p_{ik})$$

(d) Verifying that for any local period calculated hereinabove the mode change period is a multiple of this local period:

$$\forall p_{ik}, \exists n_k \in \mathbb{N}, n_k \cdot p_{ik} = p_i$$

Fifth step P45: Given x, and the largest common divisor of the components of x noted as g, calculating a vector y=(k/g).x with k a natural integer such that for each one of the actors considered in the preceding step, there is:

$$y_i \geq d_i + \frac{2x_i}{g}$$

Sixth step P46: Carrying out a symbolic execution of the data flow with at least $y_i$ activations for all the actors, by considering that the way in which the mode actors choose a mode at each activation is a round-robin selection of all the modes that they choose.

Seventh step P47: Ensuring that no mode was undetermined in the symbolic execution.

The time constraints for an instance are composed of the following elements: a time budget for all the actors; an initial delay for all the actors; a symbol associated with each actor declaring it as being either persistent or ephemeral; a symbol associated with each actor with a minimum frequency constraint declaring its constraint as being strict or relaxed; and an initial deadline associated with each actor with a minimum frequency constraint.

For a configured instance, the specified behaviour is the same as described hereinabove for a single instance, but with the following constraints in addition: A clock measures the elapsing of time starting from an initial date. The time elapsed between the beginning and the end of the activation of any actor whatsoever is less than or equal to the budget associated with this actor. No activation of an actor begins before the initial delay thereof has elapsed. The beginning of an activation of an ephemeral actor always takes place after the beginning of the preceding activation of the same actor. The beginning of an activation of a persistent actor always takes place after the end of the preceding activation of the same actor. For an actor with a minimum frequency constraint, a deadline is associated with each one of the activations thereof. For the first activation, this deadline is equal to the initial deadline, and for the following ones, their deadline is equal to the deadline of the preceding activation of this same actor plus the inverse of the minimum frequency (i.e. the minimum period). The end of the activation of an actor with a minimum frequency constraint always takes place before its deadline. For an actor with a maximum frequency constraint, a delay is associated with each one of the activations thereof; for the first activation, this deadline is equal to the initial delay, and for following ones, their delay is equal to the delay of the preceding activation of this same actor plus the inverse of the maximum frequency (i.e. the maximum period). The beginning of the activation of an actor with a maximum frequency constraint always takes place after the delay thereof.

The method of construction of the sequencing constraints (inputs for existing methodologies of allocating resources) comprises the following steps:

Step 1: Given x, associating with each actor of column i in $\Gamma$ a sequence of at least 2. $x_i$ elements where the $j^{th}$ element is defined by: a variable $s_{ij}$ for the starting date of the $j^{th}$ activation of i; a variable $e_{ij}$ for the ending date of the $j^{th}$ activation of i; and a variable $d_{ij}$ for the deadline of the $j^{th}$ activation of i.

Step 2: Defining a set of linear constraints such that: If according to the matrix $\Gamma$ and the initial state of the channels the $j^{th}$ activation of an actor i consumes at least one token from a channel and this same token is produced by the $l^{th}$ activation of an actor k then there is $e_{kl} \leq s_{ij}$. If the $j^{th}$ activation of a persistent actor i is the activation directly succeeding the $k^{th}$ activation of this same actor (i.e. k=j−1), then there is $e_{ik} \leq s_{ij}$. If the $j^{th}$ activation of an ephemeral actor i is the activation directly succeeding the $k^{th}$ activation of this same actor (i.e. k=j−1), then there is $s_{ik} \leq s_{ij}$. For the $1^{st}$ activation of an actor i with an initial delay noted as $\phi$, there is $\phi \leq s_{i1}$. For the $j^{th}$ activation of an actor with a maximum frequency constraint noted as to and an initial delay noted as $\phi$, there is $\phi+(j-1)/\omega \leq s_{ij}$. For each variable $e_{ij}$, there is $e_{ij} \leq d_{ij}$.

Step 3: Iteratively, until all of the variables $s_{ij}$ have been assigned: For each variable $s_{ij}$ not yet assigned and such that all the variables involved in the linear constraints concerning it are assigned, assigning the minimum value authorised by the linear constraints. For each variable $e_{ij}$ corresponding to a variable $s_{ij}$ assigned to this iteration, with the budget of the actor i noted as b, assigning the value $s_{ij}+b$ to $e_{ij}$.

Step 4: For each variable $d_{ij}$, if the actor i has a minimum frequency constraint noted as $\omega$ and an initial deadline noted as $\delta$, assigning the value $\delta+(j-1)/\omega$.

Step 5: For each variable $e_{ij}$, if the actor i has a strict minimum frequency constraint, ensuring that the constraint $e_{ij} \leq d_{ij}$ is complied with.

Step 6: For each variable $e_{ij}$, if the actor i has a relaxed minimum frequency constraint, and if the constraint $e_{ij} \leq d_{ij}$ is not complied with, assigning the value $d_{ij}$.

Step 7: Iteratively, until all of the variables $d_{ij}$ have been assigned: For each variable $d_{ij}$ not yet assigned, if all the variables $d_{kl}$ have already been assigned such that according to the matrix $\Gamma$ and the initial state of the channels the $j^{th}$ activation of the actor i produces at least one token in a channel and this same token is consumed by the $l^{th}$ activation of the actor k, then assigning $e_{ij}+\min_{\forall kl}(d_{kl}-e_{kl})$.

For the allocating of resources complying with the sequencing constraints of a configured instance, if the Step 5 hereinabove of this method is successfully passed, then the variables $s_{ij}$, $d_{ij}$ of each activation as well as the budget b of each actor are sufficient inputs for the allocating of execution resources and the sizing of the communication channels for the storage of tokens. For the management of reconfigurations, the fact that this information is available for the mode actors makes it possible to use for example the sequencing methodology described in [3]. In addition, it is assured that this allocation is feasible on a finite quantity of these resources.

To verify the compliance of an implementation of an actor, the variables $s_{ij}$, $d_{ij}$ of each activation are also used as well as the budget b of this actor. A test environment for an implementation of an actor makes it possible to test different scenarios S1-S6:

S1: Simulating the production of tokens by activations j of the predecessors i of this implementation under test, at the dates these activations being dependent on the tested scenario. An incomplete list of the possible scenarios is as follows: (a) Under-production: the activations are chosen in such a way that there are not enough tokens for the activation of this implementation. (b) Exact production: the activations are chosen in such a way that there is the minimum number of tokens required for the activation of this implementation. (c) Over-production: the activations are chosen in such a way that there is a sufficient number of tokens for several successive activations of this implementation.

S2: Observing the activity time of this implementation.

S3: Observing the productions resulting from this implementation.

S4: Verifying that the quantities consumed by this implementation are those provided by the specification, namely for the examples of scenarios given hereinabove: (a) Under-production: this implementation is not activated and consumes nothing. (b) Exact production: this implementation is activated exactly one time and consumes the quantities specified on each input channel. (c) Over-production: this implementation is activated exactly the number of successive times provided by the scenario, and consumes each time the quantities specified on each input channel.

S5: Verifying that the quantities produced by this implementation are those provided for by the specification, namely for the examples of scenarios given hereinabove: (a) Under-production: this implementation is not activated and consumes nothing. (b) Exact production: this implementation is activated exactly one time and consumes the quantities specified on each output channel. (c) Over-production: this implementation is activated exactly the number of successive times provided by the scenario, and produces each time the quantities specified on each output channel.

S6: Verifying that the activity time is correct with respect to the configuration of the instance, namely for the examples of scenarios given hereinabove: (a) Under-production: this implementation is not activated and its activity time is zero. (b) Exact production: this implementation is activated exactly one time and its activity time is less than or equal to the time budget of the actor corresponding to the tested implementation, and is produced within the limits defined by the corresponding variables $s_{ij}$ and $e_{ij}$. (c) Over-production: this implementation is activated exactly the number of successive times provided by the scenario, and for each one of these activations, its activity time is less than or equal to the time budget of the actor corresponding to the tested implementation, and is produced within the limits defined by the corresponding variables $s_{ij}$ and $e_{ij}$.

To verify the compliance of an implementation of a configured instance, it is possible to use for example Timed Input Output Transition Systems (TIOTS) as described in [4]. The present invention is differentiated by the fact that instead of considering the values of the data produced in response to the input values, the state of the communication channels is considered. For example, if an actor produces a token containing a character string as data, in the state of the art the character string would be observed, on the other hand in the present invention, the value "1" will be observed, being the number of tokens available in the channel.

Thus the method for constructing the valid plots is as follows: Constructing an automaton for each actor corresponding to the specified behaviour of this actor in the formalism described in [4], wherein the values produced/consumed on the channels are numerical values that indicate the state of the channel. Then, evaluating all the possible paths in a symbolic execution of the system as described in [4] in such a way as to observe the periodical behaviour described by the vector x.

The plots of an execution of an implementation of an instance can be provided by an observer of an execution of the implementation. Each input of a plot provides the information on the state of the implementation at each modification of this state. For example: the current date of the clock of the implementation of the configured instance, the number of tokens available for consumption for all the channels, and the mode associated with the tokens available for consumption.

Given such a plot, it is possible to verify the compliance of the execution of the implementation with regards to the specified behaviour of the corresponding instance, as described in [4].

The present invention applies to all data flow systems. A first application relates to the critical real-time distributed systems. In particular, a real-time on-board system of a piece of equipment, configured to receive specific measurements of the equipment and the environment thereof and to deliver results that actuate operations for the correct operation of this equipment. The equipment can be an autonomous or non-autonomous vehicle of the land, railroad, aerospace or naval type.

In particular, in the framework of a data flow system of a vehicle, it is advantageously possible to have according to the present invention, sensors and processors operating at different frequencies and according to several configurations. For example, the system of the vehicle can comprise cameras for detecting pedestrians. The sampling frequency of the cameras can be different from that of the microprocessor that will process the signals and the processing has to be sufficiently fast to warn the driver or the automaton early enough so as to trigger a braking or another action in order to avoid the pedestrian. This consumption and production at different frequencies without loss of data is possible thanks to using rational numbers of data on the channels according to the invention. Furthermore, it is possible to consider by way of example that for a car with a driver, detecting pedestrians is interesting starting from a certain speed. Thus, it is possible to use different reconfiguration modes in such a way that the pedestrian detection processing unfolds starting from a certain speed or over a certain range of speeds which allows the microprocessor to not unnecessarily consume execution resources outside of this range.

A second application relates to FPGA systems for the critical real-time: an FPGA system is a data flow clocked by clocks that trigger the processing units, and wherein the routing of the data can change dynamically.

A third application relates to a system of an industrial process configured for the industrial manufacturing of objects according to particular flow rate constraints and according to a reconfigurable process. Indeed, a method of industrial manufacturing can be viewed as a data flow, with flow rate constraints for technical reasons. Furthermore, the present invention allows for the reconfiguration of the method in order to adapt for example to a change in the order book.

BIBLIOGRAPHICAL REFERENCES

1. X. K. Do, S. Louise and A. Cohen, *Transaction Parameterized Dataflow: A model for context-dependent streaming applications,* 2016 Design, Automation & Test in Europe Conference & Exhibition (DATE), Dresden, 2016, pp. 960-965.
2. O. N. Timo, H. Marchand and A. Rollet, Automatic test generation for dataflow reactive systems modeled by variable driven timed automata, Research report HAL-00503000, 2010.
3. R. Henia and R. Ernst, Scenario Aware Analysis for Complex Event Models and Distributed Systems, 28*th IEEE International Real-Time Systems Symposium (RTSS* 2007), Tucson, Ariz., 2007, pp. 171-180.
4. Boutheina Bannour, Jose Escobedo, Christophe Gaston, Pascale Gall. *Off-Line Test Case Generation for Timed Symbolic Model-Based Conformance Testing.* Brian Nielsen; Carsten Weise. 24th International Conference on Testing Software and Systems (ICTSS), November 2012, Aalborg, Denmark. Springer, Lecture Notes in Computer Science, LNCS-7641, pp. 119-135, 2012, Testing Software and Systems.

The invention claimed is:

1. A tool for designing and validating, implemented by a computer, a data flow system modelling an on-board device of a piece of equipment, said data flow system comprising a set of at least one of software and hardware actors interconnected with each other by a set of unidirectional communication channels, said tool comprising:
   a modelling interface configured to generate an instance of said system by specifying a real-time and reconfigurable data flow, reconfiguration of the data flow being performed dynamically by propagating reconfiguration data from one actor of the actors to another actor of the actors through the set of unidirectional communication channels,
   an analysis model configured to prove a predetermined set of behavioural properties of said system by a static analysis of said instance, comprising constructing a matrix defining an activation state of the actors and a state of the set of unidirectional communication channels, and determining a natural integer vector of which a product with the matrix is zero, the determining of said natural integer vector confirming feasibility of the data flow system independently of allocated resources,
   a refinement interface configured to allocate the resources to said instance complying with said predetermined set of behavioural properties, to establish a configured instance, and
   a conformity test module comprising unitary testing and integration tools, the unitary testing tool simulating a production of data on input channels of an implementation of a particular actor, and verifying that quantities consumed and produced by the implementation correspond to those specified for the particular actor, the integration test tool constructing a set of plots that correspond to an expected behaviour of the configured instance and ensuring that each plot provided belongs to a valid set to verify conformity of behaviour of the implementation of said system with respect to said configured instance.

2. The tool according to claim 1, wherein the instance of the system comprises rational data consumption and emission rates.

3. The tool according to claim 1, wherein the instance of the system comprises:
   maximum frequency constraints for a certain actor of the actors, and
   minimum frequency constraints fora certain other actor of the actors.

4. The tool according to claim 1, wherein the instance of the system comprises:
the set of the at least one of software and hardware actors comprising generic actors configured to process data and mode actors configured to at least one of process data and select configuration modes,
the set of unidirectional communication channels connecting the set of the at least one of software and hardware actors with each other, each actor being associated with at least one input or output channel,
an integer or rational number of data produced or consumed by each of the at least one of software and hardware actors for each one of the input and output channels thereof, and
a set of modes associated with each of the mode actors, each of the mode actors being configured to dynamically choose, for each one the activations thereof, one and only one mode from among said set of modes.

5. The tool according to claim 4, wherein the instance of the system comprises, for each of the generic actors, a corresponding set of execution modes, wherein the instance executes an implicit set of all other modes and passes, an execution mode that can either be a nominal mode common to an entirety of the system, or a specific mode chosen by a mode actor.

6. The tool according to claim 1, wherein the instance of the system comprises an implicit set of feedback channels, a feedback channel, of the set of feedback channels, being a channel connecting a data-producing generic actor to a data-consuming generic actor, each executing in at least one of the modes, which is chosen by a same mode actor, and
wherein there is a path without repetition starting from said same mode actor and terminating by the data-producing generic actor by passing through the data-consuming generic actor.

7. The tool according to claim 1, wherein the instance of the system comprises an initial state of the system composed by channel of a rational number and of a sequence of modes of a length equal to said rational number rounded down, and by a generic actor of the initial mode thereof.

8. The tool according to claim 1, wherein said predetermined set of behavioural properties comprises:
a first property that verifies that resources required for implementation of communications between the actors without data loss are limited for a periodic execution of a specified system,
a second property that verifies that at least one of frequency and period constraints can be complied with without calling the first property into question,
a third property that verifies a non-existence of inter-blocking for any number of actor activations, and
a fourth property that verifies a non-existence of an unknown state in the system for all specified reconfigurations, and none of other of the properties being called into question by dynamic changes in configuration.

9. The tool according to claim 1, wherein said system is a real-time on-board system of the piece of equipment, configured to receive measurements specific to said piece of equipment, and deliver results that actuate operations for a correct operation of said piece of equipment.

10. A real-time on-board system of the piece of equipment, comprising:
the set of the at least one of the software and the hardware actors interconnected with each other by the set of unidirectional communication channels, said on-board system being designed and validated by the tool according to claim 1,
wherein said real-time on-board system is configured to receive measurements specific to said piece of equipment and an environment thereof, and deliver results that actuate operations for correct operation of said equipment.

11. The system according to claim 10, wherein said piece of equipment is an autonomous or non-autonomous vehicle of land, railroad, aerospace, or naval type.

12. A system of a real-time industrial process, designed and validated by the tool according to claim 1, wherein said system is configured for industrial manufacturing of objects according to particular flow rate constraints and according to a reconfigurable process.

13. A method for designing and validating, implemented by a computer, a data flow system modelling an on-board device of a piece of equipment, said data flow system comprising a set of at least one of software and hardware actors interconnected with each other by unidirectional communication channels, said method using the computer to perform:
generating an instance of said system by specifying a real-time and reconfigurable data flow, reconfiguration of the data flow being performed dynamically by propagating reconfiguration data from one actor of the actors to another actor of the actors through the unidirectional communication channels,
proving a predetermined set of behavioural properties of said system by a static analysis of said instance, comprising constructing a matrix defining an activation state of the actors and a state of the unidirectional communication channels, and determining a natural integer vector of which a product with the matrix is zero, the determining of said natural integer vector confirming feasibility of the data flow system independently of allocated resources,
allocating the resources to said instance complying with said predetermined set of behavioural properties, to establish a configured instance,
simulating a production of data on input channels of an implementation of a particular actor,
verifying that quantities consumed and produced by said implementation correspond to those specified for the particular actor,
constructing a set of plots that correspond to an expected behaviour of the configured instance, and
ensuring that each plot provided belongs to a valid set to verify conformity of behaviour of an implementation of said system with respect to said configured instance.

14. A non-transitory computer-readable storage medium tangibly storing code instructions configured for designing and validating a data flow system modelling an on-board device of a piece of equipment, said data flow system comprising a set of at least one of software and hardware actors interconnected with each other by unidirectional communication channels, wherein said code instructions can be executed by processing circuitry to perform:
generating an instance of said system by specifying a real-time and reconfigurable data flow, reconfiguration of the data flow being performed dynamically by propagating reconfiguration data from one actor of the actors to another actor of the actors through the unidirectional communication channels,
proving a predetermined set of behavioural properties of said system by a static analysis of said instance, comprising constructing a matrix defining an activation state of the actors and a state of the unidirectional communication channels, and determining a natural integer vector of which a product with the matrix is zero, the determining of said natural integer vector confirming feasibility of the data flow system independently of allocated resources, allocating the resources to said instance complying with said predetermined set of behavioural properties, to establish a configured instance, simulating a production of data on input channels of an implementation of a particular actor, verifying that quantities consumed and produced by said implementation correspond to those specified for the particular actor, constructing a set of plots that correspond to expected behaviour of the configured instance, and ensuring that each plot provided belongs to a valid set to verify conformity of behaviour of an implementation of said system with respect to said configured instance.

* * * * *